(12) United States Patent
Freeman et al.

(10) Patent No.: US 11,319,822 B2
(45) Date of Patent: May 3, 2022

(54) HYBRID VANE SEGMENT WITH CERAMIC MATRIX COMPOSITE AIRFOILS

(71) Applicants: Rolls-Royce North American Technologies Inc., Indianapolis, IN (US); Rolls-Royce Corporation, Indianapolis, IN (US); Rolls-Royce plc, London (GB)

(72) Inventors: Ted J. Freeman, Danville, IN (US); Jay E. Lane, Mooresville, IN (US); Michael J. Whittle, London (GB); Anthony Razzell, London (GB)

(73) Assignees: Rolls-Royce North American Technologies Inc., Indianapolis, IN (US); Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

(21) Appl. No.: 16/868,110

(22) Filed: May 6, 2020

(65) Prior Publication Data

US 2021/0348516 A1 Nov. 11, 2021

(51) Int. Cl.
*F01D 9/04* (2006.01)

(52) U.S. Cl.
CPC .......... *F01D 9/044* (2013.01); *F05D 2220/32* (2013.01); *F05D 2230/60* (2013.01); *F05D 2240/12* (2013.01)

(58) Field of Classification Search
CPC ... F01D 9/02; F01D 9/04; F01D 9/041; F01D 9/042; F01D 9/044; F05D 2240/10; F05D 2240/12; F05D 2240/125; F05D 2240/80; F05D 2240/90; F05D 2240/91; F05D 2250/12
See application file for complete search history.

(56) References Cited

U.S. PATENT DOCUMENTS

| | | |
|---|---|---|
| 4,396,349 A | 8/1983 | Hueber |
| 5,591,003 A | 1/1997 | Boyd et al. |
| 5,740,674 A | 4/1998 | Beutin et al. |
| 6,325,593 B1 | 12/2001 | Darkins, Jr. et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 6,910,854 B2 | 6/2005 | Joslin |
| 7,008,185 B2 | 3/2006 | Peterman et al. |
| 7,052,235 B2 | 5/2006 | Alford et al. |
| 7,762,766 B2 | 7/2010 | Shteyman et al. |
| 8,133,011 B2 | 3/2012 | Cortequisse |
| 8,454,303 B2 * | 6/2013 | Garcia-Crespo ........ F01D 9/042 415/137 |
| 8,454,304 B2 | 6/2013 | Heriz Agiriano et al. |
| 8,944,756 B2 | 2/2015 | Lagueux |
| 9,079,245 B2 | 7/2015 | Durocher et al. |
| 9,097,141 B2 | 8/2015 | Paradis |
| 9,546,557 B2 | 1/2017 | Groom, III et al. |
| 9,810,082 B2 | 11/2017 | Calza |

(Continued)

*Primary Examiner* — Eldon T Brockman
*Assistant Examiner* — Danielle M. Christensen
(74) *Attorney, Agent, or Firm* — Barnes & Thornburg LLP

(57) ABSTRACT

A vane assembly for use with a gas turbine engine includes an outer wall, an inner wall, and a plurality of airfoils. The outer wall and the inner wall extend at least partway about an axis. At least one of the airfoils is coupled with the outer end wall and the inner end wall to transmit force loads through the vane assembly.

18 Claims, 5 Drawing Sheets

(56) References Cited

U.S. PATENT DOCUMENTS

| | | | |
|---|---|---|---|
| 9,840,923 B2 | 12/2017 | Batt et al. | |
| 9,915,159 B2 | 3/2018 | Huizenga et al. | |
| 9,995,160 B2 | 6/2018 | Sarawate et al. | |
| 10,174,627 B2 | 1/2019 | Chang et al. | |
| 2002/0127097 A1* | 9/2002 | Darolia | F01D 5/3084 |
| | | | 415/137 |
| 2010/0068034 A1 | 3/2010 | Schiavo et al. | |
| 2014/0001285 A1 | 1/2014 | Grooms, III et al. | |
| 2014/0212284 A1 | 7/2014 | Jamison et al. | |
| 2015/0093249 A1 | 4/2015 | Lang et al. | |
| 2016/0003072 A1 | 1/2016 | Chang et al. | |
| 2016/0084096 A1 | 3/2016 | Carr et al. | |
| 2016/0130960 A1 | 5/2016 | Cortequisse | |
| 2016/0177761 A1 | 6/2016 | Huizenga et al. | |
| 2016/0201488 A1 | 7/2016 | Carr et al. | |
| 2017/0022833 A1 | 1/2017 | Heitman et al. | |
| 2017/0051619 A1 | 2/2017 | Tuertscher | |
| 2018/0045117 A1 | 2/2018 | Groves, II et al. | |
| 2018/0112679 A1* | 4/2018 | Amadon | F01D 9/042 |
| 2018/0223680 A1 | 8/2018 | Hafner | |
| 2018/0238183 A1 | 8/2018 | Reynolds et al. | |
| 2018/0328187 A1 | 11/2018 | Oke | |
| 2018/0340431 A1 | 11/2018 | Kerns et al. | |
| 2021/0285332 A1* | 9/2021 | Frey | F01D 25/246 |

* cited by examiner

HYBRID VANE SEGMENT WITH CERAMIC MATRIX COMPOSITE AIRFOILS

FIELD OF THE DISCLOSURE

The present disclosure relates generally to airfoil assemblies adapted for use in gas turbine engines and more specifically to airfoil assemblies that comprise multiple materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to high temperatures such that the airfoils are typically made from high-temperature resistant materials and/or are actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

A vane assembly adapted for use with a gas turbine engine, the vane assembly may comprise of an inner end wall, an outer end wall, a first airfoil, and a second airfoil. The inner end wall may comprise of metallic materials and be arranged circumferentially partway about a central axis. The inner end wall may define a first portion of a flow path of the vane assembly. The outer end wall may comprise of metallic materials and be arranged circumferentially partway about the central axis. The outer end wall may be located radially outward of the inner end wall. The outer end wall may define a second portion of the flow path of the vane assembly.

The first airfoil may comprise of metallic materials and extend radially between the inner end wall and the outer end wall. The first airfoil may define a third portion of the flow path of the vane assembly. The first airfoil may be mechanically fixed with the inner end wall and the outer end wall to transmit force loads acting axially on the inner end wall to the outer end wall during use of the vane assembly. In some embodiments, the inner end wall, the outer end wall, and the first airfoil are integrally formed as a single, one-piece component.

The second airfoil may comprise of entirely ceramic matrix composite materials and extend radially between the inner end wall and the outer end wall. The second airfoil may define a fourth portion of the flow path of the vane assembly and be spaced apart circumferentially from the first airfoil. The second airfoil may be coupled with the outer end wall for movement therewith. The second airfoil may extend radially into a pocket formed in the inner end wall so as to minimize transmission of the force loads acting axially on the inner end wall through the second airfoil.

In some embodiments, the outer end wall may include a body segment and a retention plate. The body segment may define the second portion of the flow path of the vane assembly. The body segment may be formed to define an airfoil passage that extends radially through the body segment and the second airfoil may be located in the airfoil passage. The retention plate may be coupled with the body segment and may cover a portion of the airfoil passage to block radial movement of the second airfoil out of the airfoil passage.

In another embodiment, the body segment may include a radially extending sidewall and a radially outward facing support wall. The radially extending sidewall may define at least a portion of the airfoil passage. The radially outward facing support wall may extend from the sidewall. The second airfoil may be formed to include an airfoil body and a rim. The airfoil body may extend radially between the inner end wall and the outer end wall. The rim may extend away from the airfoil body. The rim may be located radially between the support wall and the retention plate to cause the second airfoil to be supported radially by the support wall. In some embodiments, the support wall and the retention plate may directly engage the rim and apply a compressive force to the rim.

In further embodiments, the rim may have rectangular shape to block rotation of the second airfoil about a spoke axis that extends radially from the central axis. The rectangular shape of the rim may block rotation of the second airfoil when the rim is received in the body segment of the outer end wall.

In some embodiments, the outer end wall may include a bias member located radially between the retention plate and the second airfoil. The bias member may urge the second airfoil radially inward relative to the outer end wall toward the inner end wall.

In another embodiment, the retention plate may be formed to define a cooling passage that extends radially through the retention plate. The cooling passage may be configured to direct pressurized fluid through the retention plate and toward the second airfoil.

In further embodiments, the outer end wall may include a radially extending sidewall that defines at least a portion of an airfoil passage. The sidewall may be angled relative to the spoke axis. The second airfoil may be formed to include an airfoil body and a rim. The airfoil body may extend radially between the inner end wall and the outer end wall. The rim may extend away from the airfoil body to form an angle with the spoke axis. The rim may be supported on the sidewall to cause the second airfoil to be supported radially by the sidewall.

In some embodiments, the inner end wall may include a body segment that defines the pocket and the first portion of the flow path. The inner end wall may further include a compressible and expandable gasket between the body segment and the second airfoil.

In another embodiment, the vane assembly may further comprise a third airfoil comprising metallic materials. The third airfoil may extend radially between the inner end wall and the outer end wall and may be mechanically fixed to the inner end wall and the outer end wall for movement therewith. The third airfoil may be spaced apart circumferentially from the first airfoil and the second airfoil.

According to another aspect of the present disclosure, a vane assembly may comprise a first end wall, a second end wall, a first airfoil, and a second airfoil. The first end wall may be arranged circumferentially at least partway about a central axis. The second end wall may be arranged circumferentially at least partway about the central axis and spaced apart radially from the first end wall The first airfoil may extend radially between the first end wall and the second end wall and be fixed to the first end wall and the second end wall for movement with the first end wall and the second end wall. In some embodiments, the first end wall, the second end wall, and the first airfoil may be integrally formed as a single, one-piece component.

The second airfoil may extend radially between the first end wall and the second end wall. The second airfoil may be spaced apart circumferentially from the first airfoil. The second airfoil may be coupled with the second end wall for movement therewith and extends radially into a pocket formed in the first end wall. In some embodiments, the second airfoil may be free to move in the pocket relative to the first end wall.

In another embodiment, the second end wall may include an airfoil passage and a retention plate. The airfoil passage may extend radially through the second end wall and the second airfoil may be located in the airfoil passage. The retention plate may be coupled with the second end wall and cover a portion of the airfoil passage to block radial movement of the second airfoil out of the airfoil passage.

In further embodiments, the airfoil passage may include a radially extending sidewall, and the second end wall may include a radially outward facing support that extends from the sidewall. The second airfoil may include a radially extending airfoil body and a rim that extends from the airfoil body. The rim may be located radially outward of the support wall and engages with support wall. In some embodiments, the rim may be non-circular and received in the second end wall to block rotation of the second airfoil about a spoke axis that extends radially from the central axis.

In some embodiments, the second end wall may include a bias member located radially between the retention plate and the second airfoil. The bias member may urge the second airfoil radially inward relative to the second end wall.

In another embodiment, the airfoil passage may include an angled sidewall relative to the spoke axis. The second airfoil may include a radially extending airfoil body and a rim that extends away from the airfoil body to form an angle with the spoke axis. The rim may be supported on the sidewall to cause the second airfoil to be supported radially by the sidewall.

According to another aspect of the present disclosure, a method may provide an outer end wall, an inner end wall, and a first airfoil integrated as a single component. The outer end wall may include an airfoil passage that extends through the outer end wall, and the inner end wall may include a pocket. The method may insert a second airfoil through the airfoil passage in the outer end wall and into the pocket in the inner end wall. The method may further couple a rim of the second airfoil to an outward facing support wall of the outer end wall. The rim may be secured with a retention plate so that the rim is radially located between the support wall and the retention plate. The retention plate may block movement of the second airfoil.

These and other features of the present disclosure will become more apparent from the following description of the illustrative embodiments.

DETAILED DESCRIPTION OF THE DRAWINGS

Figure 1:
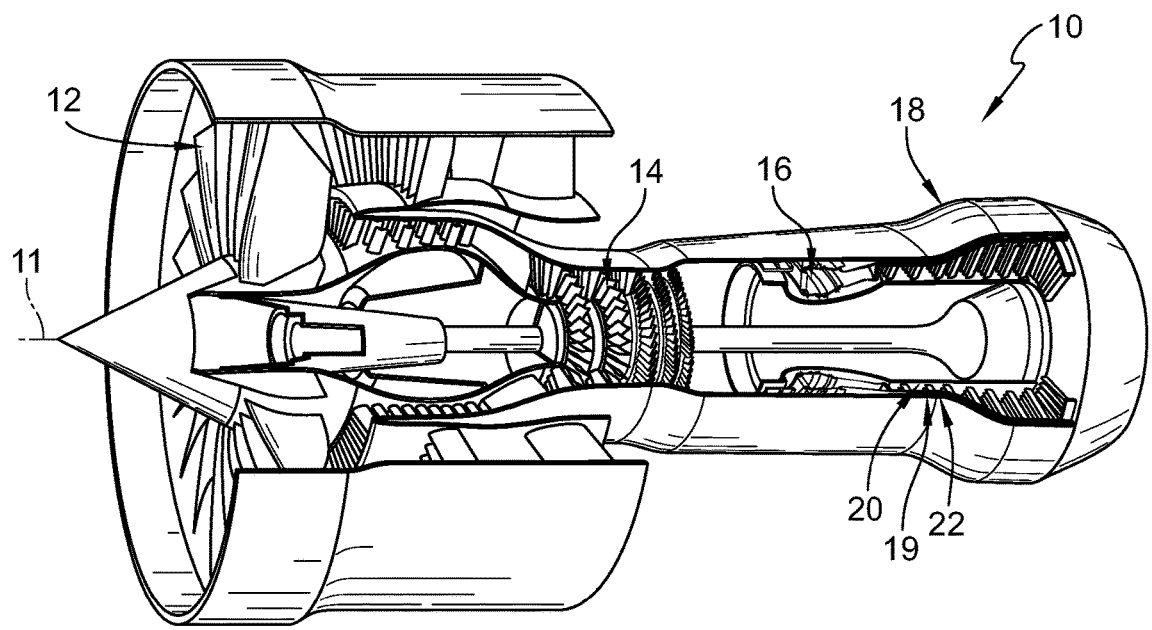
FIG. 1 is a cutaway perspective view of a gas turbine engine that includes a fan, a compressor, a combustor, and a turbine, the turbine includes multiple stages of static turbine vane ring assemblies, shown in greater detail in FIGS. 2-4, and rotating turbine wheel assemblies.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The turbine 18 includes a plurality of static turbine vane ring assemblies 19 that circumferentially turn hot, high pressure combustion products from the combustor 16 to push on a turbine wheel assembly 22 to cause the turbine wheel assembly 22 to rotate. The turbine vane ring assemblies 19 are formed from a plurality of vane assemblies 20 that each extend partway about a central axis 11 as suggested in FIGS. 1 and 2.

Figure 2:
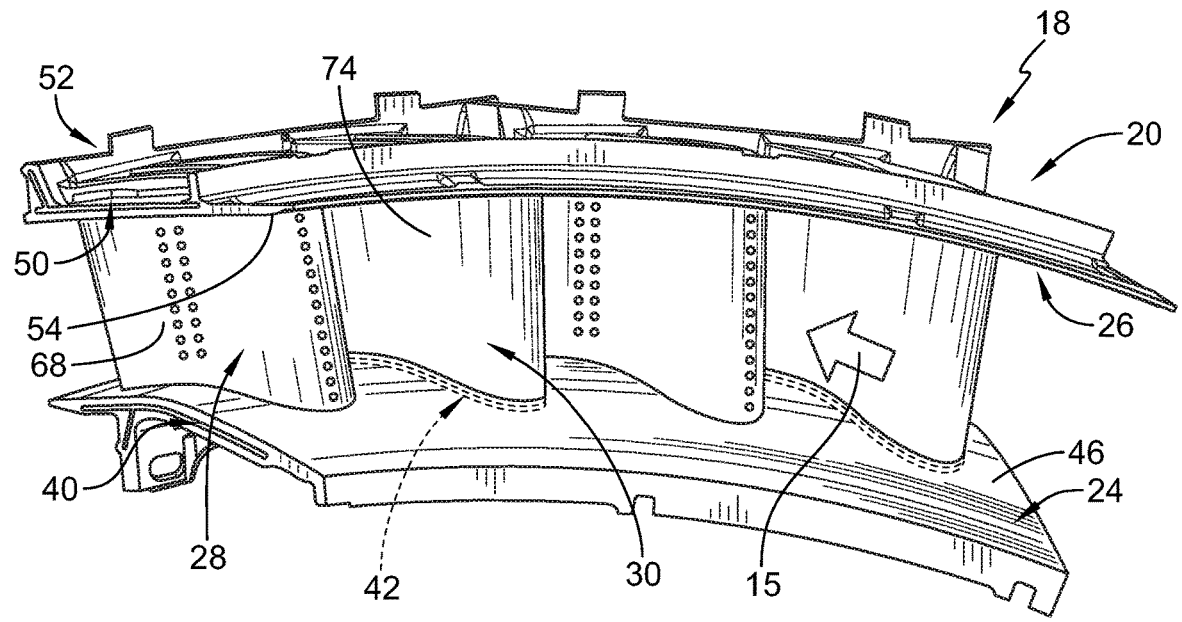
FIG. 2 is a perspective view of a static turbine vane assembly included in one of the stages of turbine vane rings included in the gas turbine engine of FIG. 1 showing that the static turbine vane assembly includes an outer wall, an inner wall, metallic airfoils that couple the outer wall with the inner wall to transmit force loads therebetween, and ceramic matrix composite airfoils that are assembled between the outer wall and the inner wall and are located circumferentially adjacent to the metallic airfoils.

Each turbine vane assembly 20 includes an outer wall 26, and inner wall 24, a first airfoil 28 made from metallic material, and a second airfoil 30 made from ceramic matrix composite material as shown in FIG. 2. The illustrative turbine vane assembly 20 includes additional metallic and ceramic matrix composite airfoils. The first airfoil 28 is mechanically fixed with the outer wall 26 and the inner wall 24 and is configured to transfer the majority of the mechanical loads from the inner wall 24 to the outer wall 26 during use of the turbine vane assembly 20. The second airfoil 30 is assembled into the vane assembly 20 between the outer wall 26 and the inner wall 24. The second airfoil 30 is configured to interact with gases passing through the turbine vane assembly 20 while receiving and transferring a smaller percentage of the mechanical loads from the inner wall 24 to the outer wall 26 due to the differences in strength characteristics between the metallic and ceramic matrix composite airfoils 28, 30.

The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

The turbine vane assembly 20 extends circumferentially partway around the central axis 11 as suggested in FIGS. 1 and 2. The outer end wall 26 is located radially outward of the inner end wall 24. The first airfoil 28 extends radially between the outer end wall 26 and the inner end wall 24. The inner end wall 24, the outer end wall 26, and the first airfoil 28 comprise metallic materials and are integrally formed as a single-piece component. In other embodiments, the first airfoil 28 is formed as a separate component and then fixed to the outer end wall 26 and the inner end wall 24. The second airfoil 30 comprises entirely ceramic matrix composite material and is assembled into the vane assembly 20 between the inner end wall 24 and the outer end wall 26. In some embodiments, the second airfoil 30 may include a metallic support structure and a ceramic matrix composite skin covering the support structure.

Figure 3:
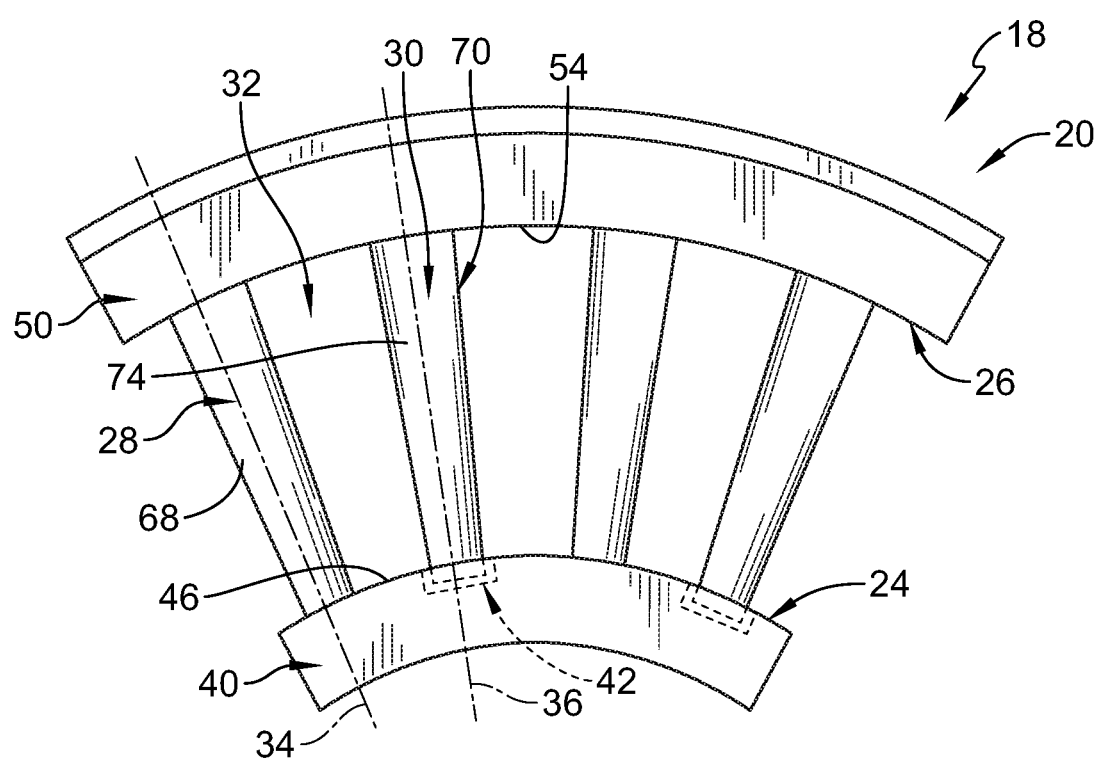
FIG. 3 is a front elevation view of the turbine vane assembly of FIG. 2 showing the outside airfoils are metallic airfoils that interconnect the outer wall and the inner wall to transmit the force loads through the turbine vane assembly and that the inner two airfoils are ceramic matrix composite airfoils that extend into pockets formed in the inner wall such that force loads applied to the ceramic matrix composite airfoils are minimized.

The first and second airfoils 28, 30 are located in the flow path 15 of the turbine 18 and are shaped to turn the hot, high pressure combustible products of the combustor 16. The second airfoil 30 is located circumferentially adjacent to the first airfoil 28 and forms an airfoil throat area 32 therebetween as shown in FIG. 3. The first airfoil 28 extends along a first spoke axis 34 that extends radially outward and perpendicular to the central axis 11. The second airfoil 30 extends along a second spoke axis 36 that extends radially outward and perpendicular to the central axis 11. The first spoke axis 34 and the second spoke axis 36 are spaced apart by a circumferential angle around the central axis 11.

Figure 4:
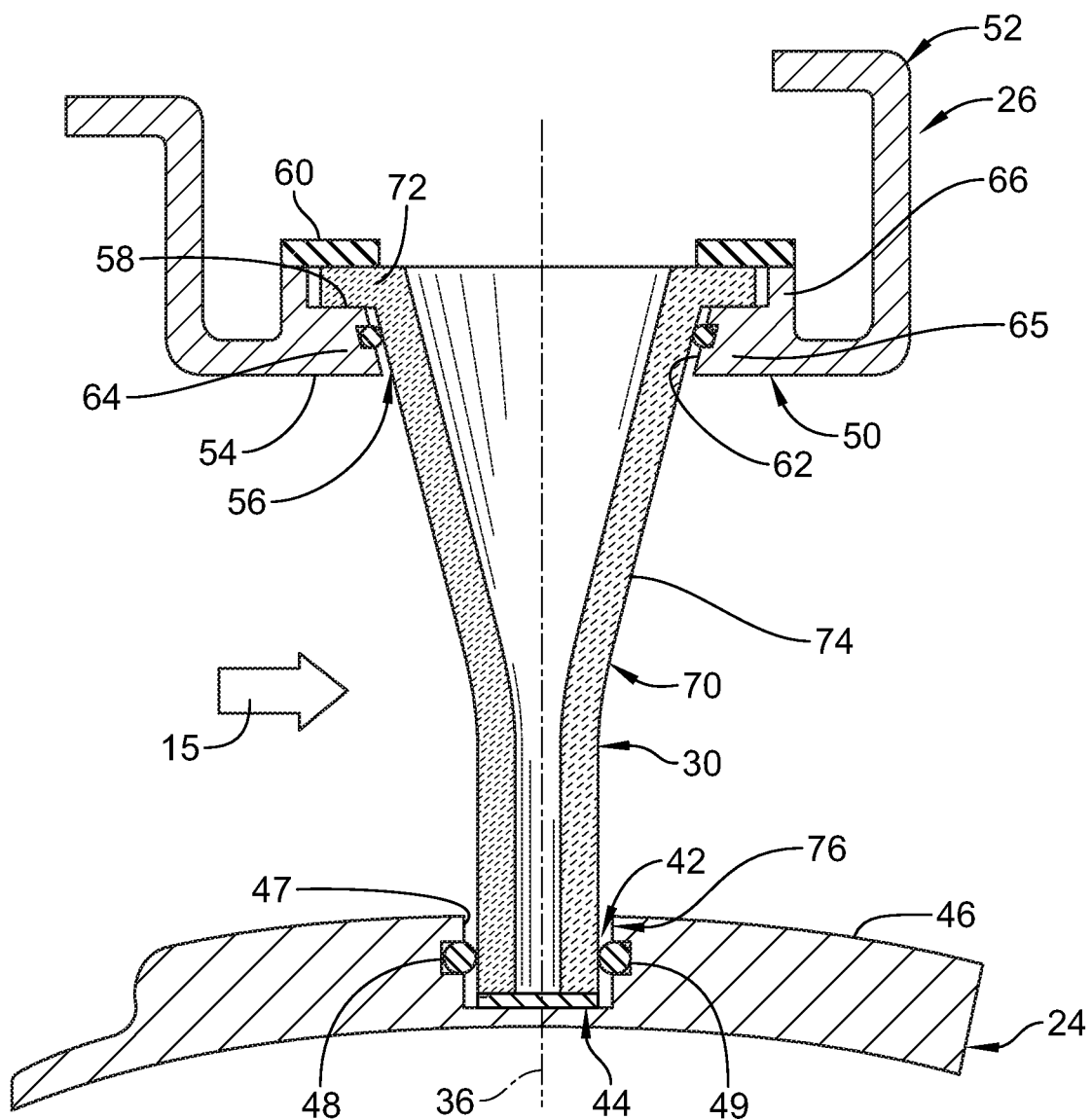
FIG. 4 is a section view of the turbine vane assembly of FIG. 2 taken through one of the ceramic matrix composite airfoils and showing that the airfoil is inserted into the static vane assembly radially inward through the outer wall and located in a pocket in the inner wall, and further showing that the ceramic matrix composite airfoil includes a rim that engages a support wall of the outer wall and is secured by a retaining plate that is coupled with a body of the outer wall.

The inner end wall 24 includes a body segment 40, a pocket 42, and a gasket 44 as shown in FIGS. 2 and 4. The body segment 40 extends circumferentially partway around the central axis 11 and extends a limited axial distance across the central axis 11. The radially outward surface of the body segment 40 forms a first portion 46 of the flow path 15 that interacts with the hot, high pressure combustible products of the combustor 16 in the flow path 15. The pocket 42 extends radially inward from the first portion 46 of the flow path 15 partway into the body segment 40 a distance. The pocket 42 is aligned to the second spoke axis 36 and includes pocket sidewalls 47 that are approximately parallel with the second spoke axis 36. The pocket 42 further includes pocket seal grooves 48 that extend away from the pocket 42 into the inner end wall 24 and extend around the perimeter of the pocket 42. The pocket seal grooves 48 may house rope seals 49 or similar sealing devices to seal against the second airfoil 30. The gasket 44 is located in the pocket 42 to seal the radial gap formed between the second airfoil 30 and the pocket 42 when the second airfoil 30 is in the assembled position.

The outer end wall 26 includes a body segment 50 and a carrier portion 52 as shown in FIG. 4. The body segment 50 extends circumferentially partway around the central axis 11 and extends a limited axial distance across the central axis 11. The carrier portion 52 is coupled to the body segment 50 and extends radially outward to couple with fixtures in the turbine 18 to position the vane assembly 20 in the turbine 18.

In another embodiment, the turbine vane assembly 20 extends circumferentially the whole way around the axis to form a full ring. The inner end wall 24 and the outer wall 26 may extend circumferentially around the axis to form full hoop components coupled together with a plurality of metallic airfoils. CMC airfoils may be assembled into the full vane ring assembly circumferentially adjacent to the metallic airfoils. In some embodiments, the full vane ring assembly may have equal numbers of metallic and CMC airfoils configured in metallic-CMC-metallic-CMC arrangement the whole way around the axis. In other embodiments, the full vane ring assembly may include more metallic airfoils than CMC airfoils and be configured so that two or more metallic airfoils are adjacent to one another in the full vane ring assembly. In some embodiments, the full vane ring assembly may include more CMC airfoils than metallic airfoils and be configured so that two or more CMC airfoils are adjacent to one another in the full vane ring assembly.

The body segment 50 of the outer end wall 26 includes a second portion 54 of the flow path 15, an airfoil passage 56, a radially outward facing support wall 58, and a retention plate 60 as shown in FIG. 4. The radially inward surface of the body segment 50 forms the second portion 54 of the flow path 15 that interacts with the hot, high pressure combustible products of the combustor 16 in the flow path 15. The airfoil passage 56 extends radially through the body segment 50 to form an aperture through which the second airfoil 30 can be assembled. The airfoil passage 56 is aligned with the second spoke axis 36. The airfoil passage 56 is defined by radially extending sidewalls 62 and sidewall seal grooves 64 that extend away from the airfoil passage 56 into the body segment 50 and extend around the perimeter of the airfoil passage 56. The sidewall seal groove 64 may house rope seals 65 or similar sealing devices to seal against the second airfoil 30.

The radially outward facing support wall 58 extends axially and circumferentially away from a radially outer portion of the airfoil passage 56 as shown in FIG. 4. The support wall 58 provides a flat surface for the second airfoil 30 to engage with in the assembled position. The support wall 58 further provides a radially outward extending retaining wall 66 around the perimeter of the support wall 58. The retention plate 60 engages with the retaining wall 66 to secure the second airfoil 30 in the assembly.

The first airfoil 28 extends between the outer end wall 26 and the inner end wall 24 as shown in FIGS. 2 and 3. The first airfoil 28 provides a third portion 68 of the flow path 15 and has airfoil shape to turn the hot, high pressure combustible products of the combustor 16 in the flow path 15. The first airfoil is mechanically fixed with the inner end wall 24 and the outer end wall 26 and is configured to take approximately 90 percent or more of the mechanical loads of the vane assembly 20 in some embodiments. The mechanical loads can include axial forces on the inner end wall 24 and rotational forces experienced by the vane assembly 20 due to pressure differences acting on different parts of vane assembly 20. In some embodiments, the pressure differences act across seal panels that are coupled to the inner end wall 24 and located radially inward of the inner end wall 24.

The second airfoil 30 includes an airfoil body 70 and a rim 72 that extends away from the airfoil body 70 as shown in FIG. 4. The second airfoil 30 provides a fourth portion 74 of the flow path 15 and has airfoil shape to turn the hot, high pressure combustible products of the combustor 16 in the flow path 15. The airfoil body 70 extends radially between the inner end wall 24 and the outer end wall 26. The airfoil body 70 has a smaller cross-section than the airfoil passage 56 of the outer end wall 26. The airfoil body 70 has a radially inner end 76 with smaller cross-section than the pocket 42 in the inner end wall 24. The airfoil body 70 may be hollow or solid. A hollow airfoil body 70 may allow of transfer of cooling air through the second airfoil 30 to provide cooling air to an inner cavity of the turbine 18. A solid airfoil body 70 may allow for better manufacturability, strength, and/or durability. The rim 72 extends away from an outer end of the airfoil body 70 around the whole perimeter of the airfoil body 70. The rim 72 has a larger cross-section than the airfoil passage 56 of the outer end wall 26, and is blocked from passing through the airfoil passage 56.

In some embodiments, the second airfoil 30 may be orientated or sized differently from the first airfoil 28 so that the first airfoil 28 experiences higher pressure loading than the second airfoil 28 and transfers more loads into the turbine vane assembly 20. The second airfoil 30 may have a lower turning angle than the first airfoil 28 in the flow path 15 so that the second airfoil 30 experiences less pressure loads. In another embodiment, the second airfoil 30 may have a shorter chordal length than the first airfoil 28 so that the second airfoil 30 experiences less pressure loads.

The pocket 42 is sized to be larger than the terminal end of the airfoil 30 located in the pocket 42 as suggested in FIG. 4. This allows the inner end wall 24 to be urged axially aft by force loads acting on the inner end wall 24 from the combustion gases during operation of the gas turbine engine 10 without applying all or most of the force loads to the second airfoil 30. The size of the pocket 42 allows the inner end wall 24 to move relative to the second airfoil 30 or, from another frame of reference, the second airfoil 30 moves in the pocket 42 relative to the inner end wall 24.

Because the first airfoil 28 is fixed with the inner end wall 24, most or all of the force loads are transmitted from the inner end wall 24 through the first airfoil 28 (and other metallic airfoils fixed to the inner end wall 24 and the outer end wall 26) to the outer end wall 26. In other words, the first airfoil 28 is mechanically fixed with the inner end wall 24 and the outer end wall 26 to transmit force loads acting axially on the inner end wall 24 to the outer end wall during use of the vane assembly 20 and the second airfoil 30 is coupled with the outer end wall 26 for movement therewith and extends radially into the pocket 42 formed in the inner end wall 24 so as to minimize transmission of the force loads acting axially on the inner end wall 24 through the second airfoil 30.

The second airfoil 30 is assembled into the vane assembly 20 by inserting the second airfoil 30 radially inward through the airfoil passage 56 in the outer end wall 26 and locating the radially inner end 76 of the second airfoil 30 in the pocket 42 as shown in FIG. 4. The airfoil body 70 passes though the airfoil passage 56 until the rim 72 engages with the support wall 58 of the outer end wall 26 to radially locate the second airfoil 30 relative to the vane assembly 20. The rim 72 is located axially and circumferentially inward of the retaining wall 66. The support wall 58 may be machined a preset distance relative to the inner end wall 24 so that the second airfoil 30 is supported at a desired radially location relative to the inner end wall 24 and the central axis 11.

The retention plate 60 covers the rim 72 of the second airfoil 30 and compresses the rim 72 towards the support wall 58 to provide engagement therebetween throughout engine operation as shown in FIG. 4. The retention plate 60 may be solid and cover the entire second airfoil 30. In other embodiments, the retention plate 60 only covers the rim 72 portion of the second airfoil 30. In further embodiments, the retention plate 60 may be solid but contain cooling holes to supply cooling air the second airfoil 30. The retention plate 60 can be brazed to the retaining wall 66. In other embodiments, the retention plate can be welded, bolted, fused, or other fastened through other similar means.

The second airfoil 30 has radial height greater than the radial distance between outer end wall 26 and the inner end wall 24. This allows the radially inner end 76 of the second airfoil 30 to extend into the pocket 42 in all engine operation conditions to compensate for the difference in coefficients of thermal expansion of the first and second airfoils 28, 30. For example, the metallic first airfoil 28 may expand further during engine operation than the ceramic second airfoil 30, resulting in the pocket 42 of the inner end wall 24 translating away from the radially inner end 76 of the second airfoil 30. The pocket 42 has sidewalls 47 that are substantially parallel to the second spoke axis 36 to allow the radially inner end 76 of the second airfoil 30 to slide radially within the pocket 42 as the first and second airfoil 28, 30 expand at different rates during engine operation. The gasket 44 can be configured to maintain a seal between the second airfoil 30 and the inner end wall 24. The radially inner end 76 of the second airfoil 30 may have a small gap with the pocket 42 to prevent overloading the second airfoil 30 from mechanical loads applied to the inner end wall 24.

The airfoil passage 56, pocket 42, and retaining wall 66 may have generally airfoil shaped perimeters that closely match the shape of the second airfoil 30. In some embodiments, the rim 72 of the second airfoil 30 and retaining wall 66 of the outer end wall 26 may have rectangular shape to block rotation of the second airfoil 30 about the second spoke axis 36. In further embodiments, the rim 72 may have non-circular shape when viewed radially inward to provide anti-rotation geometry to block rotation of the second airfoil 30 around the second spoke axis 36. In further embodiments, bias members or pins may be used between the rim 72 and the retaining wall 66 to block rotation of the second airfoil 30 about the second spoke axis 36. Bias members may also be used between the radially inner end 76 of the second airfoil 30 and the pocket 42 to block rotation of the second airfoil 30 in the pocket 42. In other embodiments, the shape of the airfoil passage 56 and the pocket 42 may be modified to match a different shape of the second airfoil 30 for the portions not exposed to the flow path 15 that may improve manufacturability of the second airfoil 30.

Figure 5:
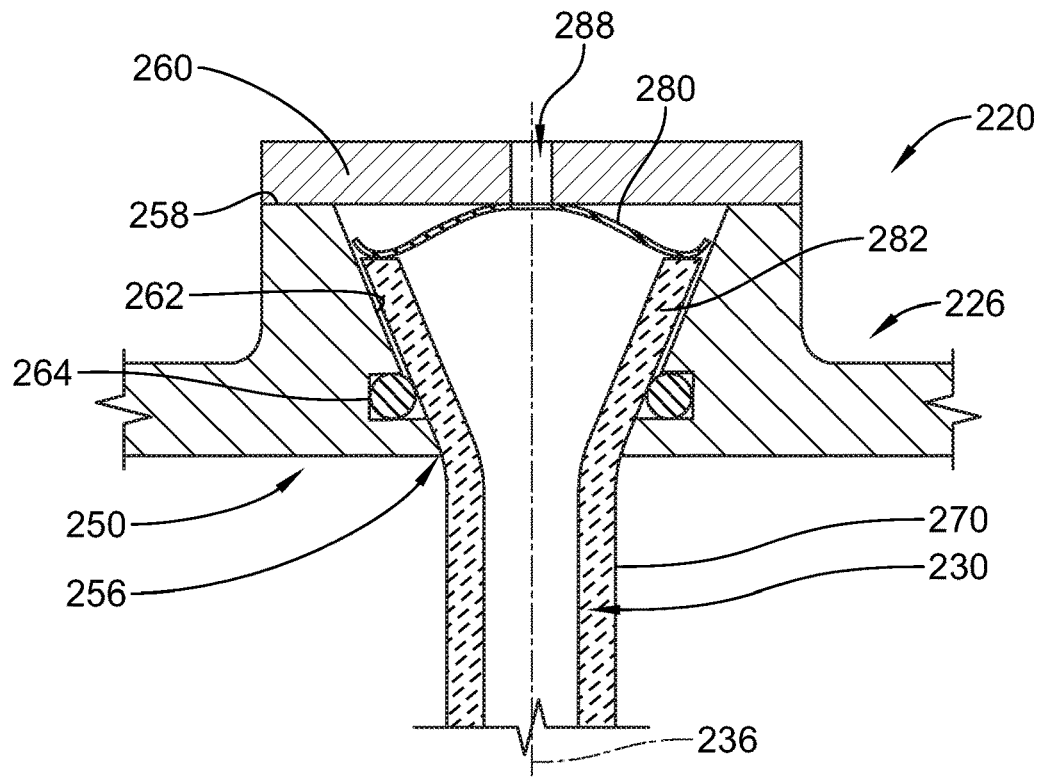
FIG. 5 is a detailed section view of another embodiment of a ceramic matrix composite airfoil of FIG. 3 showing the airfoil has an angled portion that engages a corresponding angled portion of the outer wall to radially secure the airfoil, and a bias member located between an outer edge of the airfoil and the retaining plate.

Another embodiment of a vane assembly 220 in accordance with the present disclosure is shown in FIG. 5. The vane assembly 220 is substantially similar to the vane assembly 20 shown in FIGS. 1-4 and described herein. Accordingly, similar reference numbers in the 200 series indicate features that are common between the vane assembly 220 and the vane assembly 20. The description of the vane assembly 20 is incorporated by reference to apply to the vane assembly 220, except in instances when it conflicts with the specific description and the drawings of the vane assembly 220.

The turbine vane assembly 220 includes an inner end wall, an outer end wall 226, a first airfoil 228, and a second airfoil 230 as shown in FIG. 5. The second airfoil 230 extends along a spoke axis 236 that extends radially outward and perpendicular to the central axis 11. The outer end wall 226 includes a body segment 250 that extends circumferentially partway around the central axis 11 and extends a limited axial distance across the central axis 11.

The body segment 250 includes an airfoil passage 256, a support wall 258, a retention plate 260, and a bias member 280 as shown in FIG. 5. The airfoil passage 256 extends radially through the body segment to form an aperture through which the second airfoil 230 can be assembled. The airfoil passage 256 includes radially extending sidewalls 262 and sidewall seal grooves 264 that extend away from the airfoil passage 256 into the body segment 250 and extend around the perimeter of the airfoil passage 256. The radially extending sidewalls 262 are angled relative to the spoke axis 236 so that the airfoil passage 256 diverges as it extends radially outward.

The support wall 258 extends axially and circumferentially away from a radially outer portion of the airfoil passage 256. The support wall 258 provides a flat surface for the retention plate 260 to couple with. The bias member 280 is located radially inward of the retention plate 260 and radially outward of the top of the second airfoil 230. The bias member 280 engages the retention plate 260 and the top of the second airfoil 230 to urge the second airfoil 230 radially inward.

The second airfoil 230 includes an airfoil body 270 and an angled portion 282 that extends away from the airfoil body 270 as shown in FIG. 5. The airfoil body 270 is located substantially in the flow path 15 and the angled portion is located substantially within the airfoil passage 256. The airfoil body 270 has a smaller cross-section than the airfoil passage 256 of the outer end wall 226. The angled portion 282 extends away from an outer end of the airfoil body 70 at a corresponding angle to the radially extending sidewalls 262 so that it diverges axially and circumferentially as it extends radially outward. The radially outward portion of the angled portion 282 has a larger cross-section than radially inner portion of the airfoil passage 256 so that the second airfoil 230 is blocked from passing through the airfoil passage 256.

The second airfoil 230 is assembled into the vane assembly 220 by inserting the second airfoil 230 radially inward through the airfoil passage 256 in the outer end wall 226. The airfoil body 270 passes though the airfoil passage 256 until the angled portion 282 engages with the radially extending sidewall 262 of the airfoil passage 256. The engagement between the angled portion 282 and the sidewalls 262 radially locate the second airfoil 230 relative to the vane assembly 220. The retention plate 260 covers bias member 280 and the second airfoil 230 and is coupled to the support wall 258. The bias member 280 engages the retention plate 260 and top of the second airfoil 230 and pushes the second airfoil 230 radially inward to maintain engagement between the second airfoil 230 and the airfoil passage 256 throughout engine operation. The retention plate 260 may include cooling holes 288 that extend radially through the retention plate 260. The cooling holes 288 may direct air toward and through the second airfoil 230 or impinge on a surface of the bias member 280 or a surface of the second airfoil 230.

Figure 6:
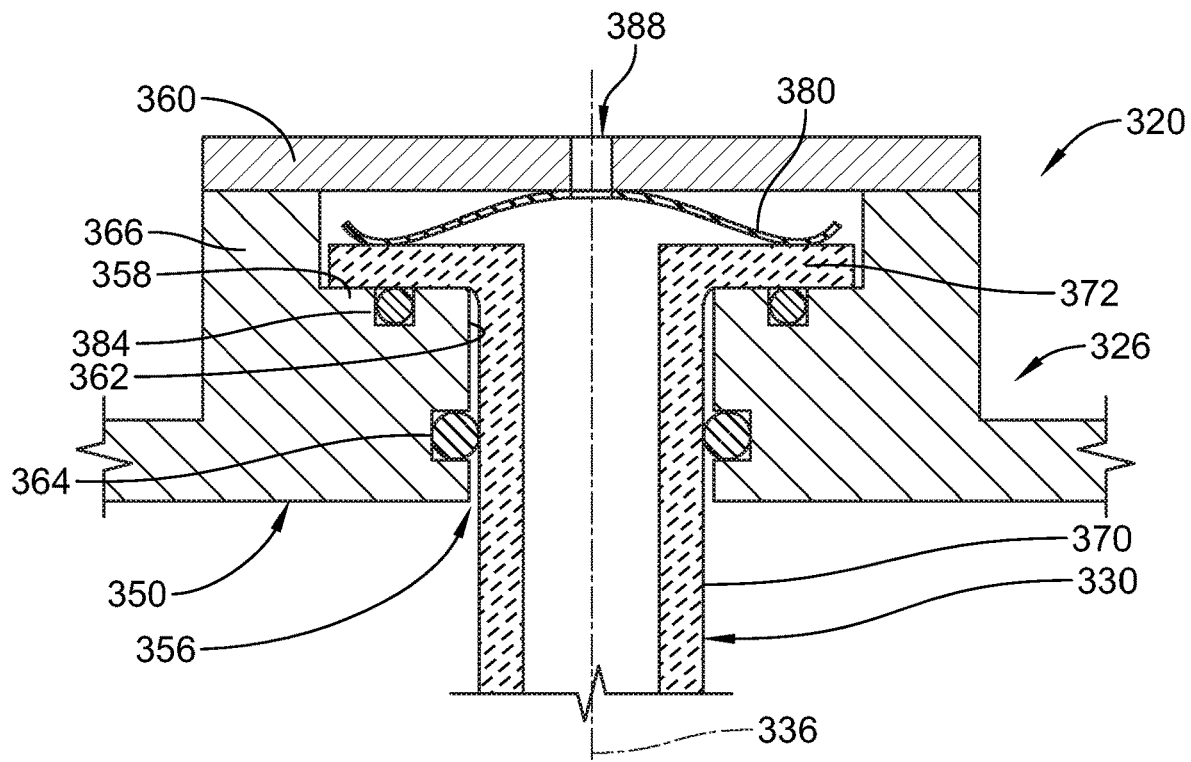
FIG. 6 is a detailed section view of another embodiment of a ceramic matrix composite airfoil of FIG. 3 showing the airfoil has a T-shape rim that engages with a support wall of the outer wall, and the outer wall includes seals on both the vertical and horizontal faces that engage with the airfoil rim.

Another embodiment of a vane assembly 320 in accordance with the present disclosure is shown in FIG. 6. The vane assembly 320 is substantially similar to the vane assembly 20 shown in FIGS. 1-4 and described herein. Accordingly, similar reference numbers in the 300 series indicate features that are common between the vane assembly 320 and the vane assembly 20. The description of the vane assembly 20 is incorporated by reference to apply to the vane assembly 320, except in instances when it conflicts with the specific description and the drawings of the vane assembly 320.

The turbine vane assembly 320 includes an inner end wall, an outer end wall 326, a first airfoil 328, and a second airfoil 330 as shown in FIG. 6. The second airfoil 330 extends along a spoke axis 336 that extends radially outward and perpendicular to the central axis 11. The outer end wall 326 includes a body segment 350 that extends circumferentially partway around the central axis 11 and extends a limited axial distance across the central axis 11.

The body segment 350 includes an airfoil passage 356, a support wall 358, a retaining wall 366, a retention plate 360, and a bias member 280 as shown in FIG. 6. The airfoil passage 356 extends radially through the body segment to form an aperture through which the second airfoil 330 can be assembled. The airfoil passage 356 includes radially extending sidewalls 362 and sidewall seal grooves 364 that extend away from the airfoil passage 356 into the body segment 350 and extend around the perimeter of the airfoil passage 356. The radially extending sidewalls 362 are substantially parallel to the spoke axis 236.

The support wall 358 extends axially and circumferentially away from a radially outer portion of the airfoil passage 356 and includes seal groove 384 that extend readily inward into the body segment 350. The support wall 358 provides a flat surface for a rim 372 of the second airfoil 330 to locate against. The retaining wall 366 extends radially outward from the support wall 358 around the perimeter of the support wall 358. The retention plate 360 engages with the retaining wall 366 to secure the second airfoil 330 in the assembly. The bias member 380 is located radially inward of the retention plate 360 and radially outward of the rim 372 of the second airfoil 330. The bias member 380 engages the retention plate 360 and the rim 372 to push the rim 372 radially inward to engage with the support wall 358.

The second airfoil 330 includes an airfoil body 370 and a rim 372 that extends away from the airfoil body 370 as shown in FIG. 6. The airfoil body 370 remains substantially parallel to the spoke axis 336 along its radial length. The airfoil body 370 has a smaller cross-section than the airfoil passage 356 of the outer end wall 326. The rim 372 extends away from the airfoil body 370 and is approximately perpendicular to the airfoil body 370. The rim 372 has a larger cross-section than the airfoil passage 356 so that the second airfoil 330 is blocked from passing through the airfoil passage 356.

The second airfoil 330 is assembled into the vane assembly 320 by inserting the second airfoil 330 radially inward through the airfoil passage 356 in the outer end wall 326. The airfoil body 370 passes though the airfoil passage 356 until the rim 372 engages with the support wall 358 of the body segment 350. The engagement between the rim 372 and the support wall 358 radially locate the second airfoil 330 relative to the vane assembly 320. The retention plate 360 covers bias member 380 and the second airfoil 330 and is coupled to the retaining wall 366. The bias member 380 engages the retention plate 360 and the rim 372 of the second airfoil 330 and pushes the second airfoil 330 radially inward to maintain engagement between the rim 372 and the support wall 358 throughout engine operation. The retention plate 360 may include cooling holes 388 that extend radially through the retention plate 360. The cooling holes 388 may direct air toward and through the second airfoil 330 or impinge on a surface of the bias member 380 or a surface of the second airfoil 330.

Figure 7:
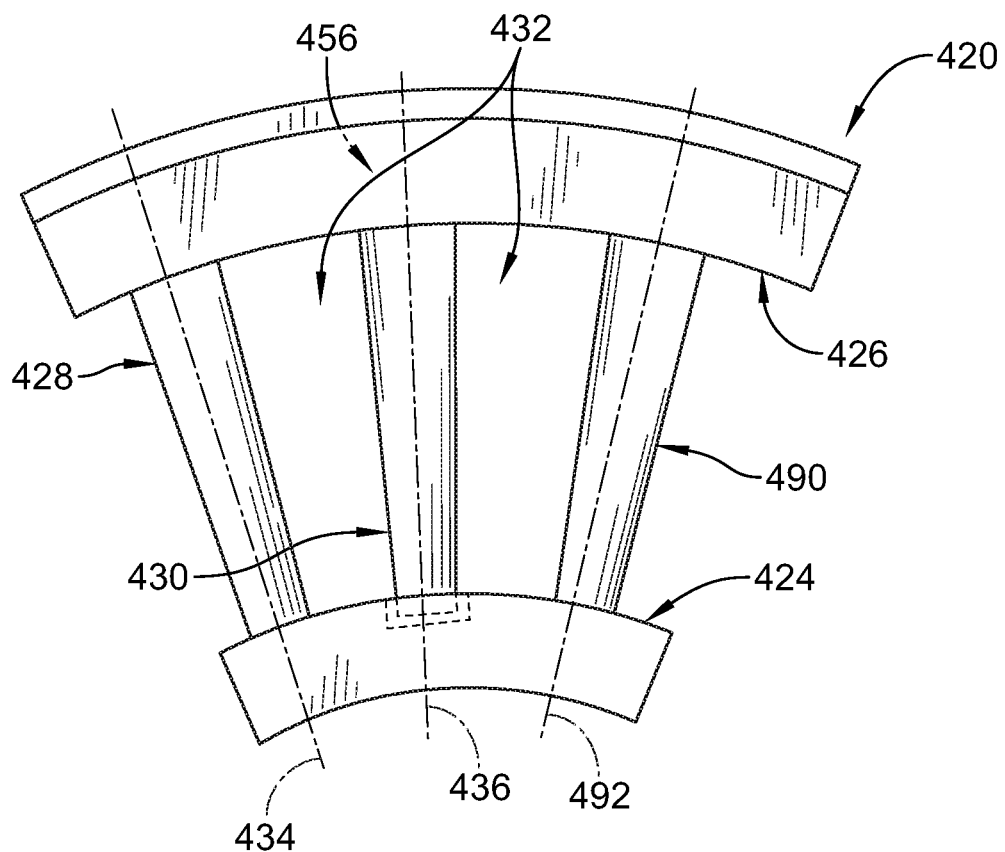
FIG. 7 is an elevation view of another embodiment of a turbine vane assembly adapted for use in the engine of FIG. 1 showing an airfoil configuration having two metallic airfoils circumferentially adjacent to either side of a ceramic matrix composite airfoil.

Another embodiment of a vane assembly 420 in accordance with the present disclosure is shown in FIG. 7. The vane assembly 420 is substantially similar to the vane assembly 20 shown in FIGS. 1-4 and described herein. Accordingly, similar reference numbers in the 400 series indicate features that are common between the vane assembly 420 and the vane assembly 20. The description of the vane assembly 20 is incorporated by reference to apply to the vane assembly 420, except in instances when it conflicts with the specific description and the drawings of the vane assembly 420.

The turbine vane assembly 420 includes an inner end wall 424, an outer end wall 426, a first airfoil 428, a second airfoil 430, and a third airfoil 490 as shown in FIG. 7. The first airfoil 428 and the third airfoil 490 extend between the outer end wall 426 and the inner end wall 424. The inner end wall 424, the outer end wall 426, the first airfoil 428 and the third airfoil 490 comprise metallic materials and are integrally formed as a single-piece component. The second airfoil 430 comprises entirely ceramic matrix composite material and is assembled into the vane assembly 420 between the inner end wall 424 and the outer end wall 426.

The first, second, and third airfoils 428, 430, 490 are located in the flow path 15 of the turbine 18 and are shaped to turn the hot, high pressure combustible products of the combustor 16. The second airfoil 430 is located circumferentially adjacent to the first airfoil 428 and forms an airfoil throat area 432 therebetween as shown in FIG. 7. The third airfoil 490 is located circumferentially adjacent to the second airfoil 430 so that the second airfoil 430 is located between the first airfoil 428 and the third airfoil 490. The second airfoil 430 and the third airfoil 490 form an airfoil throat area 432 therebetween. The first airfoil 428 extends along a first spoke axis 434 that extends radially outward and perpendicular to the central axis 11. The second airfoil 430 extends along a second spoke axis 436 that extends radially outward and perpendicular to the central axis 11. The third airfoil 490 extends along a third spoke axis 492 that extends radially outward and perpendicular to the central axis 11. The first spoke axis 434, the second spoke axis 436, and the third spoke axis 492 are spaced apart by a circumferential angle around the central axis 11.

In some embodiments, a circumferentially adjacent vane assembly in the turbine 18 may be substantially similar to the vane assembly 420. This arrangement may cause two metallic airfoils to be adjacent to one another in the turbine assembly. Two adjacent metallic airfoils may result in a throat area therebetween different to the throat area 432 between a metallic airfoil 428, 490 and a ceramic airfoil 430. This can be due to metallic and ceramic airfoils having different manufacturing capabilities and tolerances. Such a configuration of alternating throat areas may have dynamic benefits to downstream components in the turbine 18. The arrangement may also allow for selecting configurations of ceramic airfoils and metallic airfoils to yield improved dynamic conditions in the turbine 18.

The first airfoil 428 extends between the outer end wall 426 and the inner end wall 424 along the first spoke axis 434 as shown in FIG. 7. The first airfoil 428 is mechanically fixed with the inner end wall 424 and the outer end wall 426. The third airfoil 490 extends between the outer end wall 426 and the inner end wall 424 along the third spoke axis 492. The third airfoil 490 is mechanically fixed with the inner end wall 424 and the outer end wall 426. The first airfoil 428 and the third airfoil 490 are configured to take approximately 90 percent of the mechanical loads of the vane assembly 420. The second airfoil 430 is assembled into the vane assembly 420 by inserting the second airfoil 430 radially inward through an airfoil passage 456 in the outer end wall 426.

The vane assembly 420 may have additional benefits for coating the first airfoil 428 and the third airfoil 490 with a thermal barrier coating when the second airfoil 430 is not in the assembled position. When the second airfoil 430 is not assembled there may be more access to the first and third airfoils 428, 490 and the inner and outer end walls 424, 426. In addition, the vane assembly 420 may allow for additional or improved airfoil machining, polishing, or cooling configurations before the second airfoil 430 is assembled into the vane assembly 420.

The vane assembly 420 may have further benefits by supporting a great portion of the inner and outer end walls 424, 426 with the third airfoil 490. Configurations of vane assembly with a ceramic airfoil at a circumferential end of the vane assembly may give the inner and outer end walls 424, 426 a large cantilever. A large cantilever may allow for large deflections of the outer and inner end walls at a distal circumferential end of the vane assembly in relation to a circumferentially adjacent vane assembly. Vane configurations, such as vane assembly 420 may be selected to minimize inner and outer end wall deflections with adjacent vane assemblies.

In further embodiments, vane configurations may be selected with four airfoils with a metallic-ceramic-ceramic-metallic airfoil configuration. In other embodiments, vane configurations may be selected with four airfoils with a metallic-ceramic-metallic-ceramic airfoil configuration. In other embodiments, vane configurations may be selected with four airfoils, using three ceramic airfoils and one metallic airfoil. In other embodiments, vane configurations may be selected with four airfoils, using one ceramic airfoil and three metallic airfoils. In other embodiments, vane assemblies may be selected with four or more airfoils in a vane assembly.

The present disclosure provides a method for a vane assembly 20 where the end walls 24, 26 and, at least one of the airfoils 28 is metallic. Mechanical and aero loads may be transferred to the outer end wall 26 through the metallic airfoils 28. The inner and outer end walls 24, 26 and metallic airfoils 28 may be cast as a single piece but it is feasible that they could be assembled via bi-casting, brazing, or similar method. The remaining airfoils 30 of the vane assembly 20 could be made from ceramic matrix composite and could be inserted radially inward through a hole 56 in the outer end wall 26 into a pocket 42 in the inner end wall 24. Seals 49, 65 may be used at both the inner and outer portions of the airfoil 30 to end wall 24, 26 interfaces to act as dampers and to act as seals to minimize leakage of air under the ceramic matrix composite airfoil 30. The quantity of metallic airfoils 28 may be sufficient to take up a substantial portion of the mechanical loading that is imparted to the vane assembly 20.

In some embodiments, the outer portion of the airfoil 230 might have an angled surface 282 that would engage smoothly with a similarly angled surface 262 in the end wall 26 as shown in FIG. 5. A single seal groove 264 could be machined in the metallic angled surface 262 and a spring 280 could be placed on top of the airfoil 230 and held in place with a retention plate 260 that may be welded or brazed in place.

In another embodiment, the vane assembly 320 may include a "T-shape" formed at the top of the ceramic matrix composite airfoils 330 as shown in FIG. 6. In this embodiment, a lower and upper seal 364, 384 could be used to minimize any leakage issues. A spring 380 and retaining plate 360 could be used to both locate and retain the airfoil 330. Alternatively, a ceramic matrix composite doublet with integrated end walls could be applied to reduce sealing concerns.

Another embodiment may include alternating metallic and ceramic airfoils such that the working fluid passage may be half ceramic matrix composite walled and half metallic and is circumferentially repeated. This may reduce dynamic forcing issues with adjacent blade rows and enable the use of different sized or shaped airfoils without inducing significant circumferential flow variation. Compared to a uniformly size set of ceramic matrix composite airfoils, this embodiment might have improved aerodynamic performance as the uniform ceramic matrix composite airfoils may have a relatively large maximum thickness to increase to provide a sufficient second moment of area. However, a metallic airfoil may withstand larger mechanical loads so the mixed material set may have improved aerodynamic freedom i.e. option for reduced thickness and could result in an aerodynamically superior solution when compared to a uniform size ceramic matrix composite vanes.

This embodiment may work equally well for a cooled and an uncooled ceramic matrix composite airfoil. While the same benefit may be different as if all of the airfoils were ceramic matrix composite, there may still be a significant benefit relative to a fully metallic vane assembly at a potentially reduced cost. Cooling air reduction in the ceramic matrix composite airfoils could be used to provide enhanced cooling to the metallic airfoils or to the end walls to increase the life of the component or the air could be eliminated providing a cycle improvement.

The present disclosure may take advantage of the significant engine experience associated with nickel vane assemblies along with better understanding of the damage mechanisms. This may provide a robust and reliable mechanical load transfer approach. Due to the improved durability of metallic vanes over CMC vanes, if cooling or sealing air is to be transited through the nozzle guide vane ring then it may be advantageous to only transmit the flow through the metallic vanes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly adapted for use with a gas turbine engine, the vane assembly comprising
an inner end wall comprising metallic materials, the inner end wall arranged circumferentially partway about a central axis and defining a first portion of a flow path of the vane assembly,
an outer end wall comprising metallic materials, the outer end wall arranged circumferentially partway about the central axis and located radially outward of the inner end wall, the outer end wall defining a second portion of the flow path of the vane assembly,
a first airfoil comprising metallic materials, the first airfoil extends radially between the inner end wall and the outer end wall and defines a third portion of the flow path of the vane assembly, and
a second airfoil comprising entirely ceramic matrix composite materials, the second airfoil extends radially between the inner end wall and the outer end wall and defines a fourth portion of the flow path of the vane assembly, the second airfoil being spaced apart circumferentially from the first airfoil,
wherein the first airfoil is mechanically fixed with the inner end wall and the outer end wall to transmit force loads acting axially on the inner end wall to the outer end wall during use of the vane assembly and the second airfoil is coupled with the outer end wall for movement therewith and extends radially into a pocket formed in the inner end wall so as to minimize transmission of the force loads acting axially on the inner end wall through the second airfoil, and
wherein the outer end wall includes a body segment that defines the second portion of the flow path of the vane assembly and a retention plate, the body segment is formed to define an airfoil passage that extends radially through the body segment, the second airfoil is located in the airfoil passage, and the retention plate is coupled to only the body segment and covers a portion of the airfoil passage to block radial movement of the second airfoil out of the airfoil passage.

2. The vane assembly of claim 1, wherein the body segment includes a radially extending sidewall that defines at least a portion of the airfoil passage and a radially outward facing support wall that extends from the sidewall, the second airfoil is formed to include an airfoil body that extends radially between the inner end wall and the outer end wall and a rim that extends away from the airfoil body, and the rim is located radially between the support wall and the retention plate to cause the second airfoil to be supported radially by the support wall.

3. The vane assembly of claim 2, wherein the rim is rectangular shaped and received in the body segment of the outer end wall to block rotation of the second airfoil about a spoke axis that extends radially from the central axis.

4. The vane assembly of claim 2, wherein the support wall and the retention plate directly engage the rim and apply a compressive force to the rim.

5. The vane assembly of claim 1, wherein the outer end wall includes a bias member located radially between the retention plate and the second airfoil to urge the second airfoil radially inward relative to the outer end wall toward the inner end wall.

6. The vane assembly of claim 1, wherein the retention plate is formed to define a cooling passage that extends radially through the retention plate and is configured to direct pressurized fluid through the retention plate and toward the second airfoil.

7. The vane assembly of claim 1, wherein the outer end wall includes a radially extending sidewall that defines at least a portion of an airfoil passage, the sidewall is angled relative to a spoke axis that extends radially from the central axis, the second airfoil is formed to include an airfoil body that extends radially between the inner end wall and the outer end wall and a rim that extends away from the airfoil body to form an angle with the spoke axis, and the rim is supported on the sidewall to cause the second airfoil to be supported radially by the sidewall.

8. The vane assembly of claim 1, wherein the inner end wall, the outer end wall, and the first airfoil are integrally formed as a single, one-piece component.

9. The vane assembly of claim 1, wherein the inner end wall includes a body segment that defines the pocket and the first portion of the flow path and a compressible and expandable gasket between the body segment and the second airfoil.

10. The vane assembly of claim 1, further comprising a third airfoil comprising metallic materials, the third airfoil extends radially between the inner end wall and the outer end wall, the third airfoil is mechanically fixed to the inner end wall and the outer end wall for movement therewith, and the third airfoil is spaced apart circumferentially from the first airfoil and the second airfoil.

11. A vane assembly adapted for use with a gas turbine engine, the vane assembly comprising
a first end wall arranged circumferentially at least partway about a central axis,
a second end wall arranged circumferentially at least partway about the central axis and spaced apart radially from the first end wall,
a first airfoil that extends radially between the first end wall and the second end wall, the first airfoil fixed to the first end wall and the second end wall for movement with the first end wall and the second end wall, and
a second airfoil that extends radially between the first end wall and the second end wall, the second airfoil being spaced apart circumferentially from the first airfoil, and the second airfoil coupled with the second end wall for movement therewith and extends radially into a pocket formed in the first end wall, and
wherein the second end wall includes an airfoil passage that extends radially through the second end wall, the airfoil passage includes an angled sidewall relative to a spoke axis that extends radially from the central axis, the second airfoil includes a radially extending airfoil body and a rim that extends away from the airfoil body to form an angle with the spoke axis, and the rim is supported on the sidewall to cause the second airfoil to be supported radially by the sidewall.

12. The vane assembly of claim 11, wherein the second airfoil is free to move in the pocket relative to the first end wall.

13. The vane assembly of claim 11, wherein the second end wall includes an airfoil passage that extends radially through the second end wall, the second airfoil is located in the airfoil passage, and a retention plate is coupled with the second end wall and covers a portion of the airfoil passage to block radial movement of the second airfoil out of the airfoil passage.

14. The vane assembly of claim 13, wherein the airfoil passage includes a radially extending sidewall, and the second end wall includes a radially outward facing support that extends from the sidewall, the second airfoil includes a radially extending airfoil body and a rim that extends from the airfoil body, and the rim is located radially outward of the support wall and engages with support wall.

15. The vane assembly of claim 14, wherein the rim is non-circular and received in the second end wall to block rotation of the second airfoil about a spoke axis that extends radially from the central axis.

16. The vane assembly of claim 13, wherein second end wall includes a bias member located radially between the retention plate and the second airfoil to urge the second airfoil radially inward relative to the second end wall.

17. The vane assembly of claim 11, wherein the first end wall, the second end wall, and the first airfoil are integrally formed as a single, one-piece component.

18. A method comprising
providing an outer end wall, an inner end wall, and a first airfoil integrated as a single component, the outer end wall includes an airfoil passage that extends through the outer end wall, and the inner end wall includes a pocket,
inserting a second airfoil through the airfoil passage in the outer end wall and into the pocket in the inner end wall, and
coupling a rim of the second airfoil to an outward facing support wall of the outer end wall and securing the rim with a retention plate so that the rim is radially located between the support wall and the retention plate, and the retention plate blocks movement of the second airfoil.

* * * * *